United States Patent
Yang

(10) Patent No.: US 11,525,381 B2
(45) Date of Patent: Dec. 13, 2022

(54) APPARATUS FOR RECOVERING EXHAUST HEAT USING A DUAL TUBE

(71) Applicants: HYUNDAI MOTOR COMPANY, Seoul (KR); KIA CORPORATION, Seoul (KR)

(72) Inventor: Young-Dug Yang, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/372,111

(22) Filed: Jul. 9, 2021

(65) Prior Publication Data
US 2022/0136426 A1    May 5, 2022

(30) Foreign Application Priority Data

Nov. 2, 2020  (KR) ........................ 10-2020-0144188

(51) Int. Cl.
| F28D 7/00 | (2006.01) |
| F01N 5/02 | (2006.01) |
| F01N 3/20 | (2006.01) |
| F01P 7/16 | (2006.01) |
| F02N 19/10 | (2010.01) |
| F28D 21/00 | (2006.01) |
| F28D 7/10 | (2006.01) |

(52) U.S. Cl.
CPC ............. *F01N 5/02* (2013.01); *F01N 3/2006* (2013.01); *F01P 7/16* (2013.01); *F02N 19/10* (2013.01); *F28D 21/0003* (2013.01); *F28D 7/10* (2013.01); *F28F 2210/08* (2013.01)

(58) Field of Classification Search
CPC ........... F01N 2240/02; F01N 2260/024; F01N 2260/02; Y02E 10/44; F28D 21/0003; F28D 7/106; F28D 7/103; F28D 1/04
See application file for complete search history.

(56) References Cited

FOREIGN PATENT DOCUMENTS

| CN | 108798792 A | * | 11/2018 | .............. B22F 5/106 |
| DE | 112012005326 T5 | * | 10/2014 | .............. F02G 5/02 |
| ES | 2322702 T3 | * | 6/2009 | ............. F01N 3/043 |

* cited by examiner

Primary Examiner — George C Jin
Assistant Examiner — Teuta B Holbrook
(74) Attorney, Agent, or Firm — Lempia Summerfield Katz LLC

(57) ABSTRACT

The present invention relates to an apparatus installed in a vehicle for recovering exhaust heat. The apparatus includes: a housing having therein a heat exchanger and having a front through hole through which exhaust gas is introduced and a rear through hole through which the introduced exhaust gas is discharged; a first tube installed in the housing and having a dual tube structure; and a second tube connected to the first tube and having a dual tube structure. A coolant introduced through the second tube passes through the first tube and exchanges heat with the exhaust gas in the heat exchanger in the housing. The coolant, which has exchanged heat, is discharged to an engine through the first tube and the second tube.

12 Claims, 16 Drawing Sheets

FIG. 1 - PRIOR ART

FIG. 10
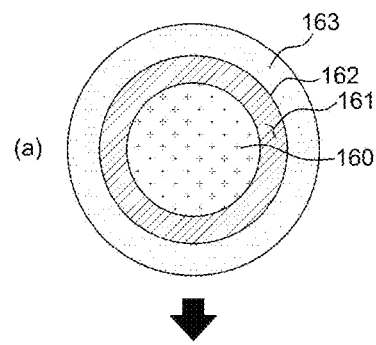
(a)
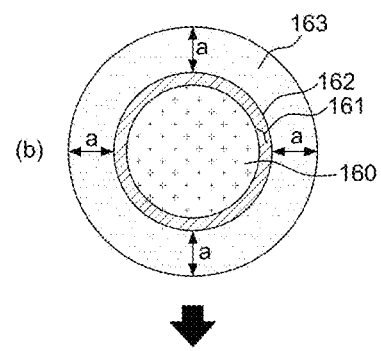
(b)
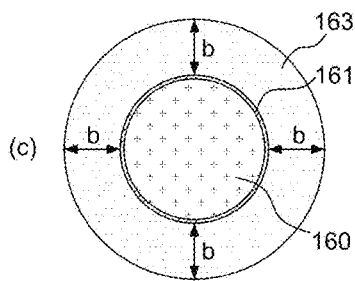
(c)

APPARATUS FOR RECOVERING EXHAUST HEAT USING A DUAL TUBE

CROSS-REFERENCE TO RELATED APPLICATIONS

This application claims priority under 35 U.S.C. § 119 to Korean Patent Application No. 10-2020-0144188, filed on Nov. 2, 2020, in the Korean Intellectual Property Office, the disclosure of which is incorporated herein by reference in its entirety.

BACKGROUND

1. Field of the Disclosure

The present disclosure relates to an apparatus for recovering exhaust heat installed in a vehicle. The apparatus includes a housing having therein a heat exchanger, a front through hole through which exhaust gas is introduced, and a rear through hole through which the introduced exhaust gas is discharged. The apparatus also includes a first tube installed in the housing and having a dual tube structure and a second tube connected to the first tube and having a dual tube structure. A coolant introduced through the second tube passes through the first tube and exchanges heat with the exhaust gas in the heat exchanger in the housing. The coolant, which has exchanged heat, is discharged to an engine through the first tube and the second tube.

2. Description of the Related Art

In general, an apparatus for recovering exhaust heat is installed to improve fuel economy of a vehicle, and a principle thereof is as follows.

More specifically, when an engine of the vehicle is started, a high rotational speed (RPM) is maintained until the engine is heated to a predetermined temperature, causing a warm-up state in which a high degree of soot and smoke is maintained, which causes a deterioration in fuel economy.

Therefore, the principle of the apparatus for recovering exhaust heat is to shorten the warm-up time of the engine. The warm-up time is shortened by raising a temperature of a coolant using a heat exchanger to exchange heat with exhaust gas discharged from the engine when the engine is started. With this principle, it is possible to improve fuel economy of the vehicle and reduce emission of soot and smoke.

FIG. 1 is a configuration view of an exhaust heat recovering device 10 in the related art. The device 10 includes an exhaust pipe 11 through which exhaust gas discharged from an engine is introduced and a housing 12 configured to raise a temperature of a coolant by using a heat exchanger and exchanging heat with exhaust gas introduced through the exhaust pipe 11. The exhaust heat recovering device 10 further includes: an inflow tube 13 through which the coolant is input into the housing 12 for the purpose of heat exchange; an outflow tube 14 through which the coolant, of which the temperature is raised by the heat exchange using the exhaust gas in the housing 12, is discharged; and a through hole 15 through which the exhaust gas, which has been introduced into the housing 12 through the exhaust pipe 11 and has exchanged heat with the coolant, is discharged to a muffler connected to a rear end of the housing 12.

However, because the exhaust heat recovering device 10 in the related art configured as described above is shaped such that the inflow tube 13 and the outflow tube 14 extend along a shape or a structure of a vehicle body of a vehicle, it is difficult to design a shape of the tube. Additionally, the number of brackets for fixing the tube to the vehicle body is increased. Accordingly, efficiency in performing assembly processes deteriorates.

When the exhaust heat recovering device 10 is installed in the vehicle body, members for reinforcing rigidity of the vehicle body are removed to ensure gaps between the exhaust heat recovering device 10 and peripheral components. As a result, there is concern that Noise, Vibration, and Harshness (NVH) performance of the vehicle deteriorates.

SUMMARY

The present disclosure has been made in an effort to provide an apparatus for recovering exhaust heat, in which a shape of a tube is simple. The apparatus may be easily installed in a vehicle body, such that efficiency in performing assembly processes may be improved. Also, gaps between the apparatus and peripheral components are minimized, such that there is no restriction in installing components for reinforcing rigidity of the vehicle body.

An embodiment of the present disclosure provides an apparatus for recovering exhaust heat. The apparatus includes: a housing having therein a heat exchanger and having a front through hole through which exhaust gas is introduced and a rear through hole through which the introduced exhaust gas is discharged; a first tube installed in the housing and having a dual tube structure; and a second tube connected to the first tube and having a dual tube structure. A coolant introduced through the second tube passes through the first tube and exchanges heat with the exhaust gas in the heat exchanger in the housing. The coolant, which has exchanged heat, is discharged to an engine through the first tube and the second tube.

According to the apparatus for recovering exhaust heat using a dual tube according to the present disclosure configured as described above, the tube of the apparatus for recovering exhaust heat, which serves to introduce and discharge the coolant, is designed to have the simple shape by applying the dual tube structure. Therefore, efficiency in performing assembly processes may be improved because it is easy to install the apparatus in a vehicle body. Further, it is possible to minimize gaps between the apparatus for recovering exhaust heat and peripheral components, thereby eliminating factors that restrict the installation of components for reinforcing rigidity of the vehicle body. As a result, it is possible to improve an NVH effect of the vehicle.

A channel may be formed to adjust the amount of coolant to be introduced by using wax in the cap of a wax supply unit. Thus, the overall coolant, which is heated by the heat exchanger of the apparatus for recovering exhaust heat, is discharged to the outside. As a result, abnormal sound (different types of noise), which occurs when the residual coolant is heated by the heat exchanger, is eliminated, and durability of the apparatus for recovering exhaust heat is maintained appropriately.

BRIEF DESCRIPTION OF THE DRAWINGS

FIGS. 5a-5d are detailed views of the housing of the apparatus for recovering exhaust heat according to the present disclosure, in which FIG. 5a is a partial side perspective view of the housing, FIG. 5b is a perspective view of a first tube, FIG. 5c is a cross-sectional view taken along line B-B' in FIG. 5b, and FIG. 5d is a cross-sectional view taken along line A-A' in FIG. 5a.

FIGS. 9a and 9b are transverse cross-sectional views of the second tube of the apparatus for recovering exhaust heat according to the present disclosure, in which FIG. 9a is a transverse cross-sectional view taken along line C-C' in FIG. 7, and FIG. 9b is a transverse cross-sectional view taken along line D-D' in FIG. 7.

FIG. 10 shows views (a), (b), and (c) illustrating an operation of a U-shaped tube of the apparatus for recovering exhaust heat according to the present disclosure.

DETAILED DESCRIPTION OF THE EMBODIMENTS

Hereinafter, a configuration and an operation of an apparatus for recovering exhaust heat using a dual tube according to the present disclosure is described in detail with reference to the drawings.

The disclosed drawings are provided as an example for fully conveying the spirit of the present disclosure to those having ordinary skill in the art. Therefore, the present disclosure is not limited to the drawings and embodiments described below and may be specified as other aspects and embodiments.

In addition, unless otherwise defined, the terminologies used in the specification of the present disclosure have the meanings that a person having ordinary skill in the art to which the present disclosure pertains typically understands. In the following description and the accompanying drawings, a detailed description of publicly-known functions and configurations has been omitted so as to avoid unnecessarily obscuring the subject matter of the present disclosure.

Figure 1:
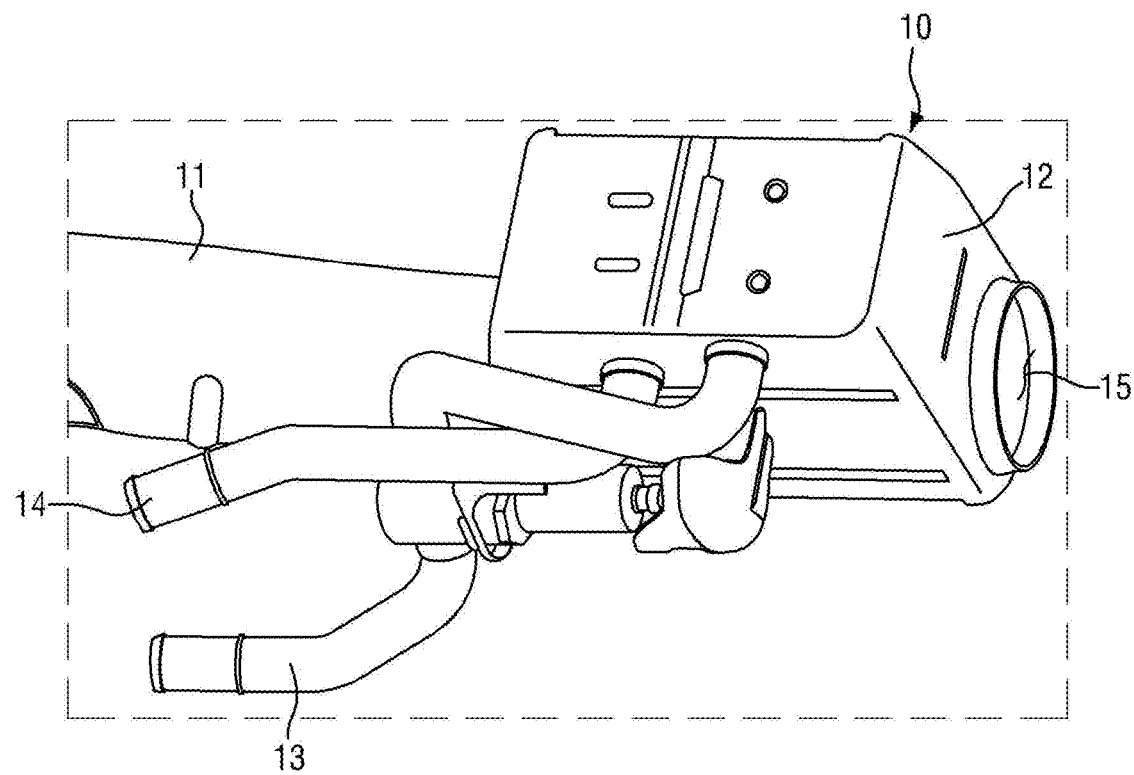
FIG. 1 is a configuration view of an apparatus for recovering exhaust heat in the related art.
Figure 2:
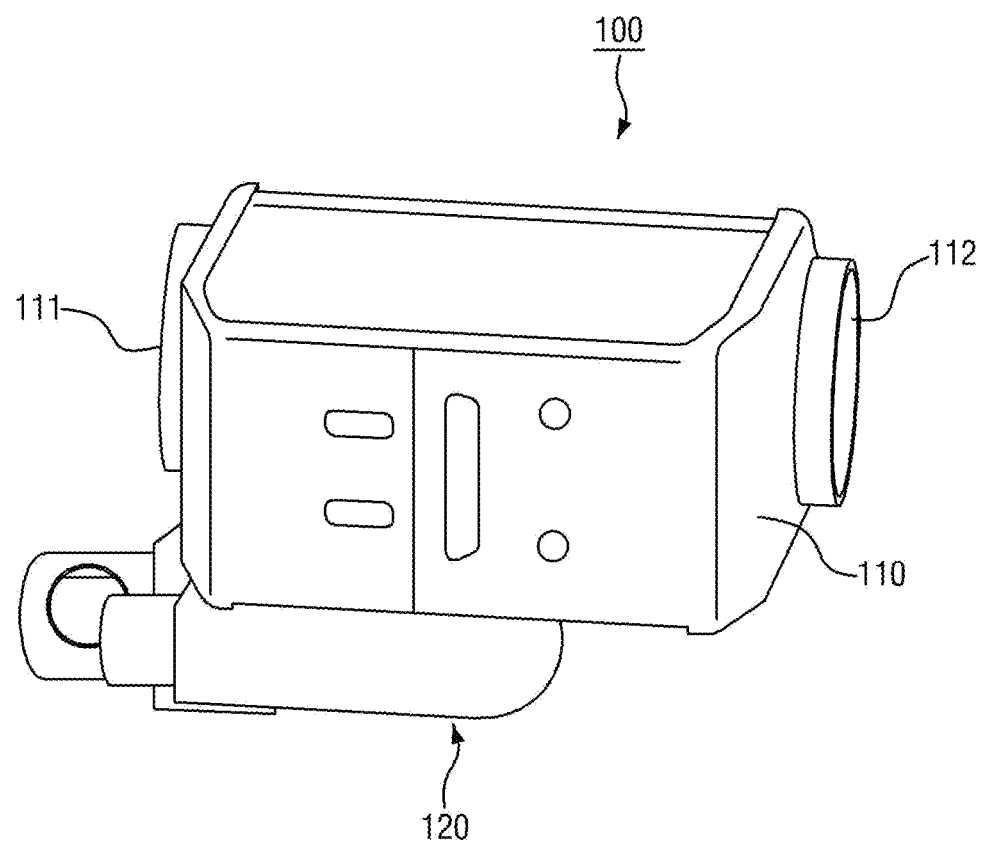
FIG. 2 is a partial front perspective view of an apparatus for recovering exhaust heat according to the present disclosure.
Figure 3:
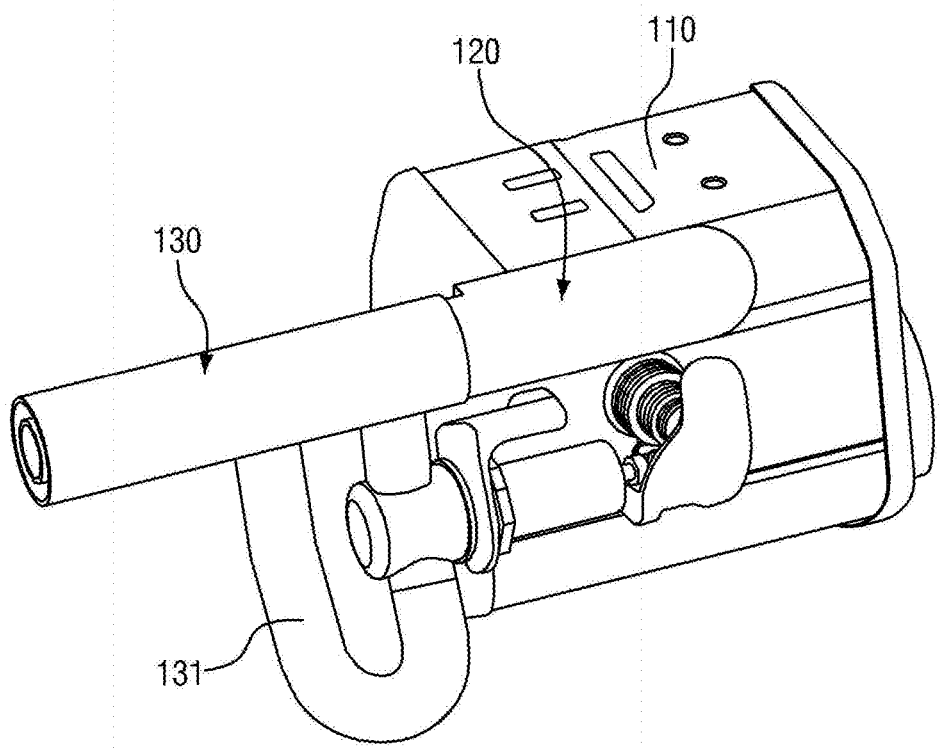
FIG. 3 is a partial bottom perspective view of the apparatus for recovering exhaust heat according to the present disclosure.

FIG. 2 is a partial front perspective view of an apparatus for recovering exhaust heat according to the present disclosure. FIG. 3 is a partial bottom perspective view of the apparatus for recovering exhaust heat according to the present disclosure.

First, referring to FIG. 2, an apparatus 100 for recovering exhaust heat according to the present disclosure includes a housing 110 configured to define an external appearance of the recovery apparatus. The housing has a heat exchanger 150 therein and a first tube 120 installed outside the housing 110 and having a dual tube structure. A front through hole 111 through which exhaust gas discharged from an engine is introduced is formed at one side of the housing 110. A rear through hole 112 through which the exhaust gas after heat exchange is discharged to the outside of the housing 110 is formed at the other side of the housing 110.

Referring to a partial bottom perspective view in FIG. 3, the apparatus 100 for recovering exhaust heat according to the present disclosure includes a second tube 130 connected to the first tube 120. A U-shaped tube 131 is connected to the second tube 130.

Both the first tube 120 and the second tube 130 have the dual tube structure and are configured such that a coolant is introduced and discharged through the dual tube structure.

According to the apparatus 100 for recovering exhaust heat according to the present disclosure configured as described above, the coolant introduced through the second tube 130 passes through the first tube 120 and passes through the heat exchanger 150 installed in the housing 110. Then the coolant is discharged to the outside through the first tube 120 and the second tube 130. In this case, a temperature of the coolant passing through the heat exchanger 150 is raised by a temperature of the exhaust gas introduced through the front through hole 111 of the housing 110. Then the exhaust gas is discharged from the housing 110 through the rear through hole 112 and transmitted to a muffler (not illustrated) connected to a rear end of the apparatus 100 for recovering exhaust heat. Noise of the exhaust gas transmitted to the muffler is reduced and then the exhaust gas is discharged to the outside of a vehicle.

The apparatus for recovering exhaust heat according to the present disclosure configured as described above is described in more detail below.

Figure 4:
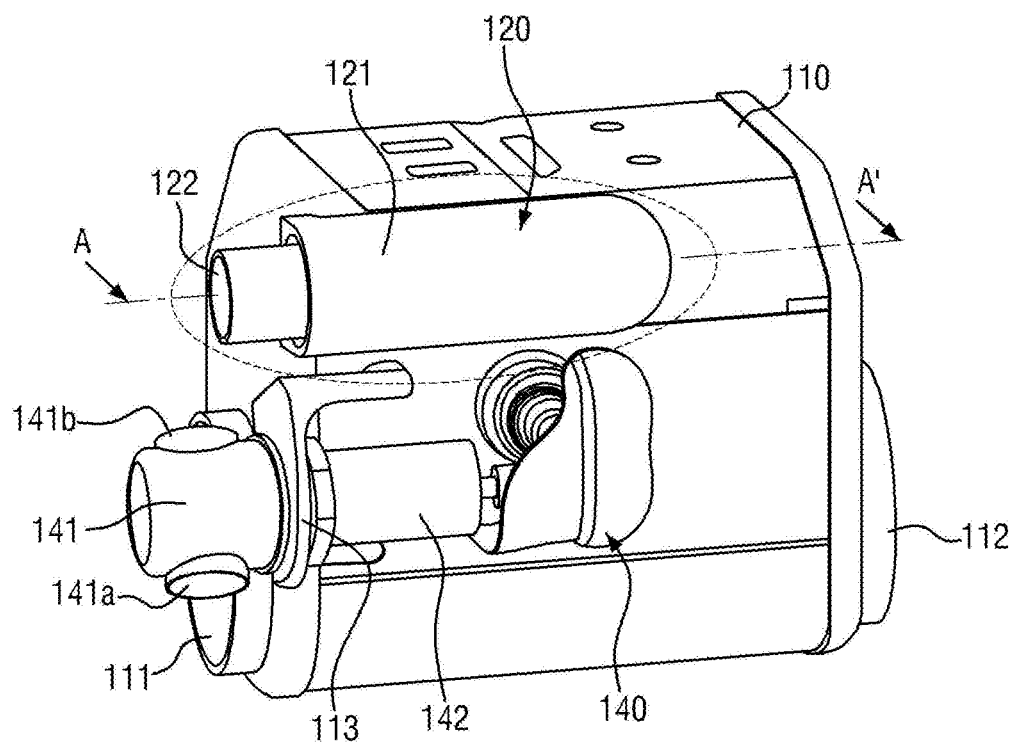
FIG. 4 is a partial bottom perspective view of a housing of the apparatus for recovering exhaust heat according to the present disclosure.
Figure 5A:
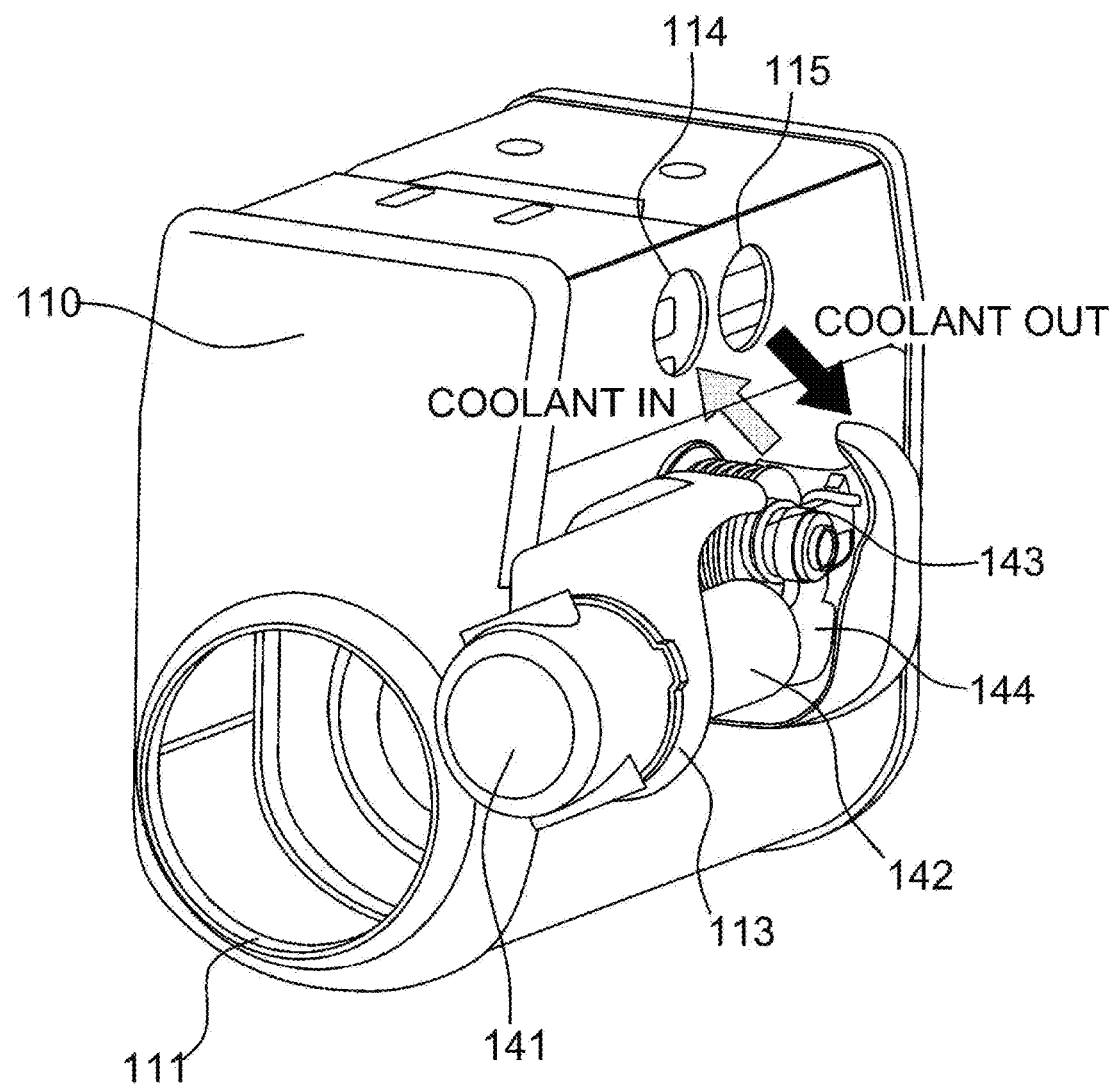
Figure 5B:
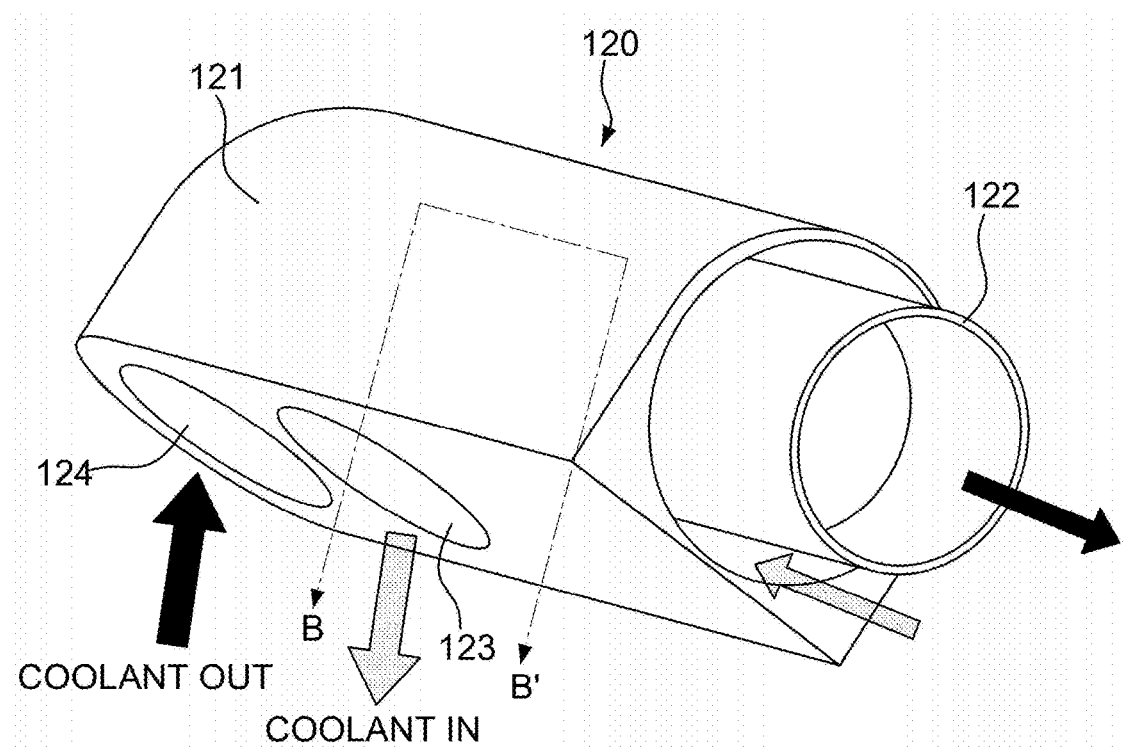
Figure 5C:
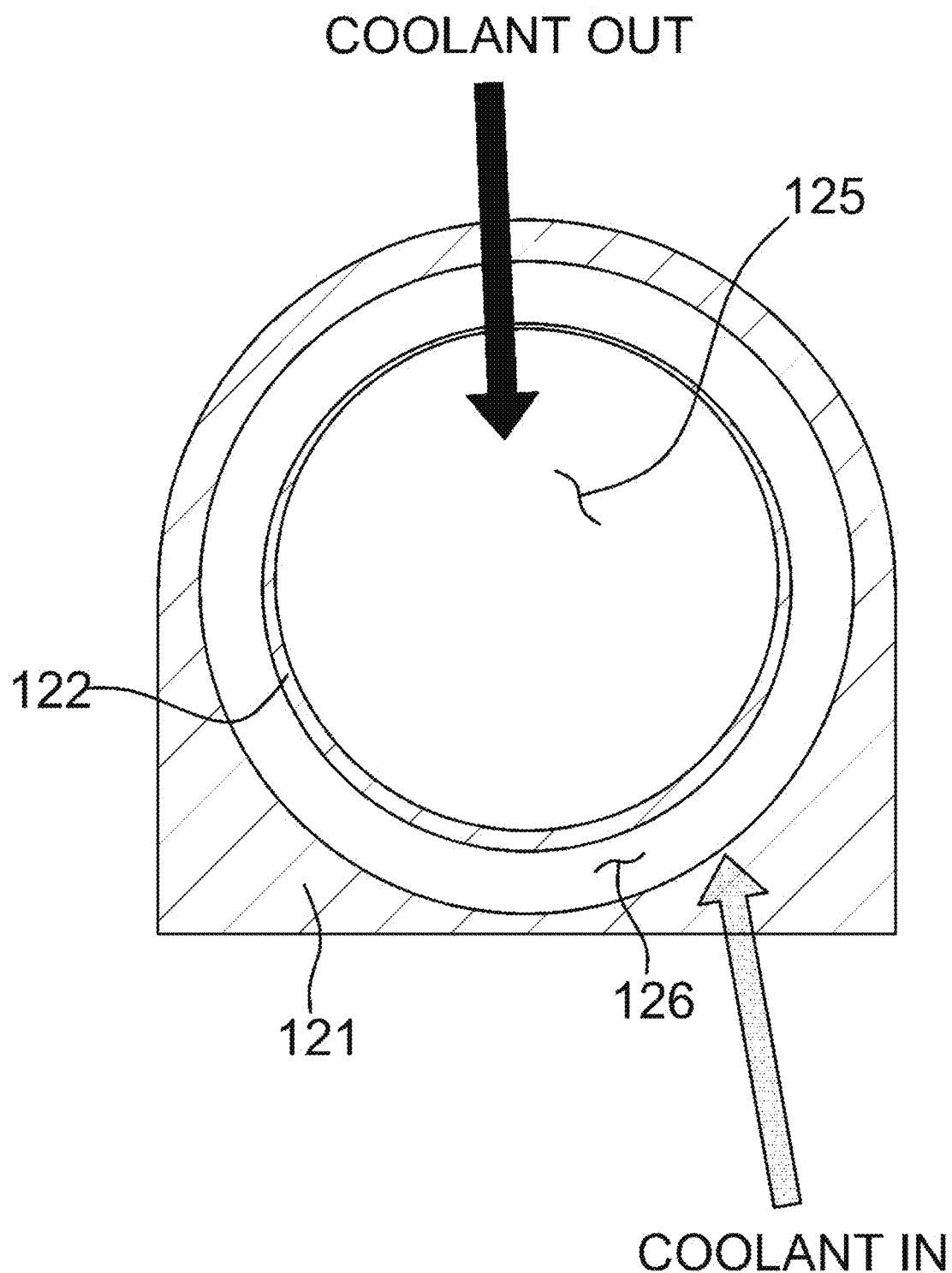
Figure 5D:
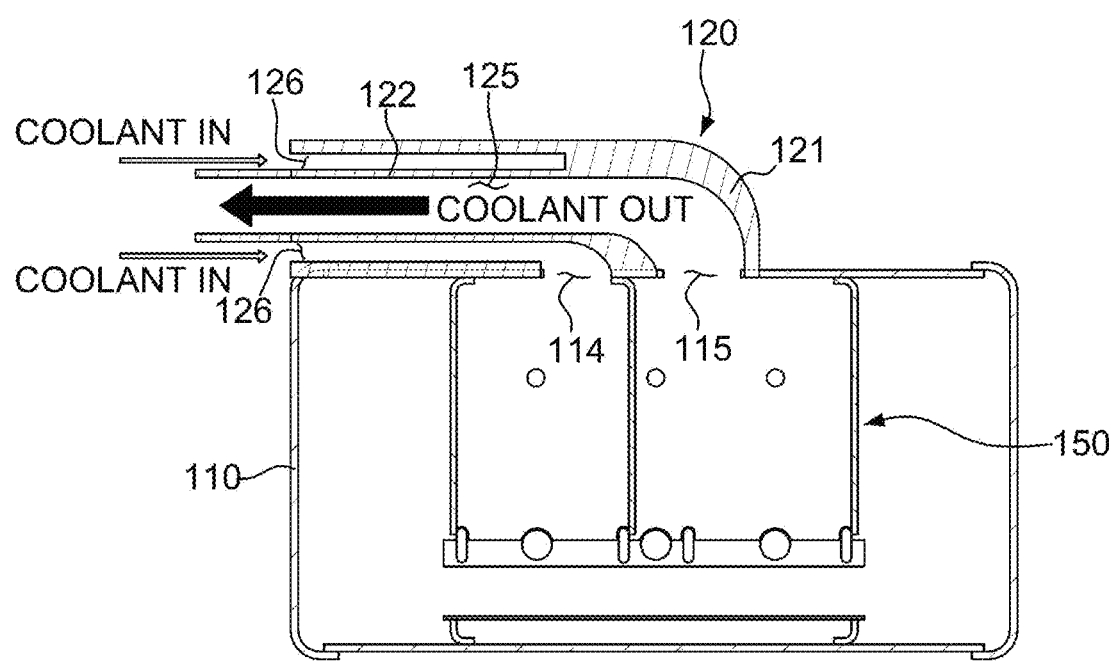

FIG. 4 is a partial bottom perspective view of the housing of the apparatus for recovering exhaust heat according to the present disclosure. FIGS. 5a-5d are detailed views of the housing of the apparatus for recovering exhaust heat according to the present disclosure. FIG. 5a is a partial side perspective view of the housing, FIG. 5b is a perspective view of the first tube, FIG. 5c is a cross-sectional view taken along line B-B' in FIG. 5b, and FIG. 5d is a cross-sectional view taken along line A-A' in FIG. 5a.

Referring to FIGS. 4 and 5a illustrating the apparatus for recovering exhaust heat according to the present disclosure in detail, the first tube 120 installed outside the housing 110 of the apparatus 100 for recovering exhaust heat according to the present disclosure has a dual tube structure including an outer tube 121 and an inner tube 122 installed in the outer tube 121.

A wax supply unit 140 is installed outside the housing 110.

The wax supply unit 140 is configured to supply wax to be expanded or shrunk in accordance with a temperature of the coolant introduced through the U-shaped tube 131 connected to the second tube 130. The wax supply unit 140 includes a container 142 coupled by a bracket 113 mounted outside the housing 110. The container 142 is opened at one side thereof and has a space portion for receiving the wax. The wax supply unit 140 has a cap 141 configured to seal the opening at one side of the container 142 and allow the wax received in the container 142 to be supplied therethrough. The wax supply unit 14 further includes a valve 144 installed at the other side of the container 142 and configured to adjust the amount of wax received in the cap 141 and the container 142 by elastic force of a spring 143 that operates in conjunction with the valve 144.

The cap 141 has a lower hole 141*a* and an upper hole 141*b* through which the coolant introduced from the U-shaped tube 131 flows.

An inflow port 114 and an outflow port 115 through which the coolant flows are formed at one side of the housing 110.

Referring to FIGS. 5*b* and 5*c*, the inner tube 122 is installed in the outer tube 121 of the first tube 120, and an outlet port 123 and an inlet port 124 for the coolant are formed in a bottom surface of the outer tube 121. The inlet port 124 communicates with the coolant outflow port 115 formed in the housing 110, and the outlet port 123 communicates with the coolant inflow port 114 formed in the housing 110.

An internal space of the inner tube 122 defines a coolant discharge path 125 through which the coolant introduced into the coolant inlet port 124 flows to the second tube 130. A space between the outer tube 121 and the inner tube 122 defines a coolant inflow path 126 through which the coolant introduced from the second tube 130 flows to the coolant outlet port 123.

Therefore, according to the apparatus for recovering exhaust heat according to the present disclosure configured as described above, as illustrated in the cross-sectional view taken along line A-A' in FIG. 5*d*, the coolant introduced from the second tube 130 is introduced into the heat exchanger 150 through the coolant inflow port 114 via the coolant inflow path 126. The coolant exchanges heat, in the heat exchanger 150, with the high-temperature exhaust gas introduced into the heat exchanger 150 through the front through hole 111, such that a temperature of the coolant is raised. The coolant is discharged to the second tube 130 through the coolant discharge path 125 of the first tube 120 via the coolant outflow port 115.

Figure 6:
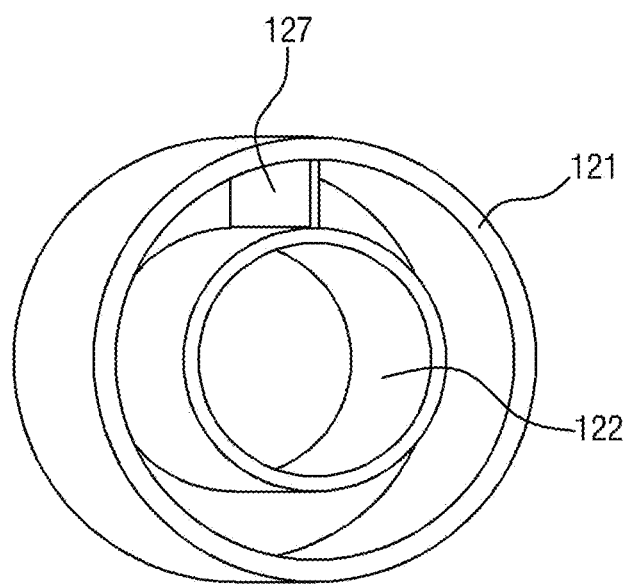
FIG. 6 is a cross-sectional view of the first tube of the apparatus for recovering exhaust heat according to the present disclosure.

FIG. 6 is a cross section perspective view of the first tube 120 of the apparatus for recovering exhaust heat according to the present disclosure. The inner tube 122 is securely supported in the internal space of the outer tube 121 by a support piece 127 attached, at one side thereof, to an inner circumferential surface of the outer tube 121 and attached, at the other side thereof, to an outer circumferential surface of the inner tube 122. A plurality of support pieces 127 may be installed in the first tube 120 with appropriate gaps therebetween.

Next, a configuration of the second tube 130 of the apparatus 100 for recovering exhaust heat according to the present disclosure is described in detail.

Figure 7:
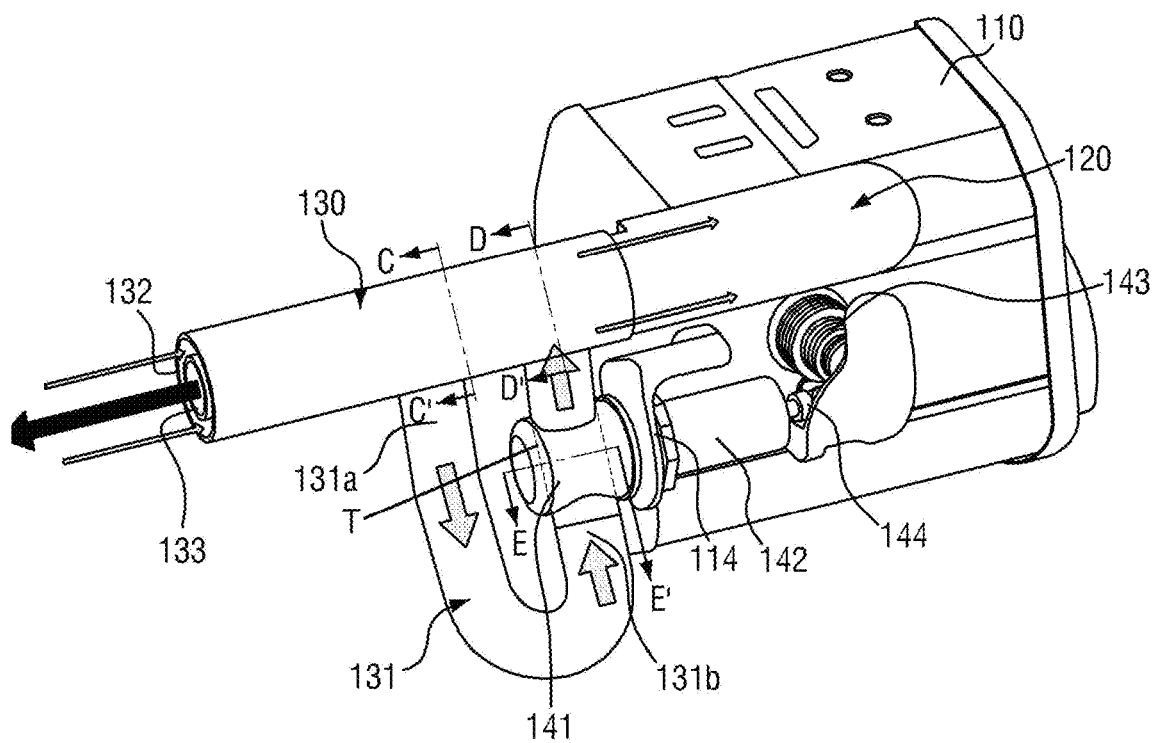
FIG. 7 is a perspective view illustrating a state in which a second tube of the apparatus for recovering exhaust heat according to the present disclosure is connected.
Figure 8:
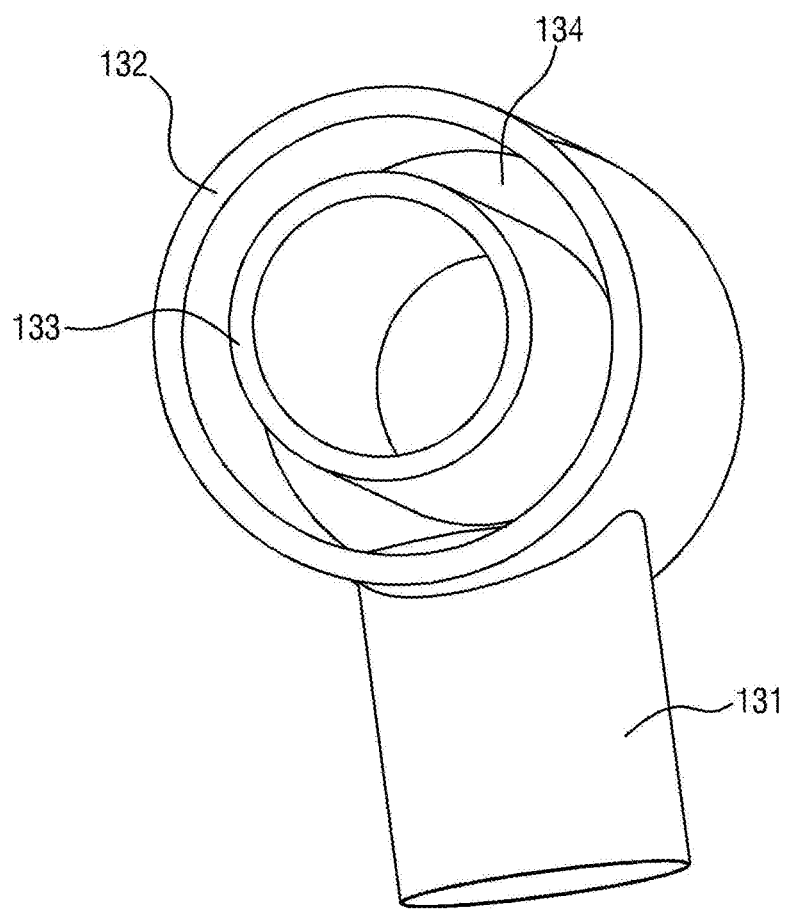
FIG. 8 is a longitudinal sectional view of the second tube of the apparatus for recovering exhaust heat according to the present invention.
Figure 9A:
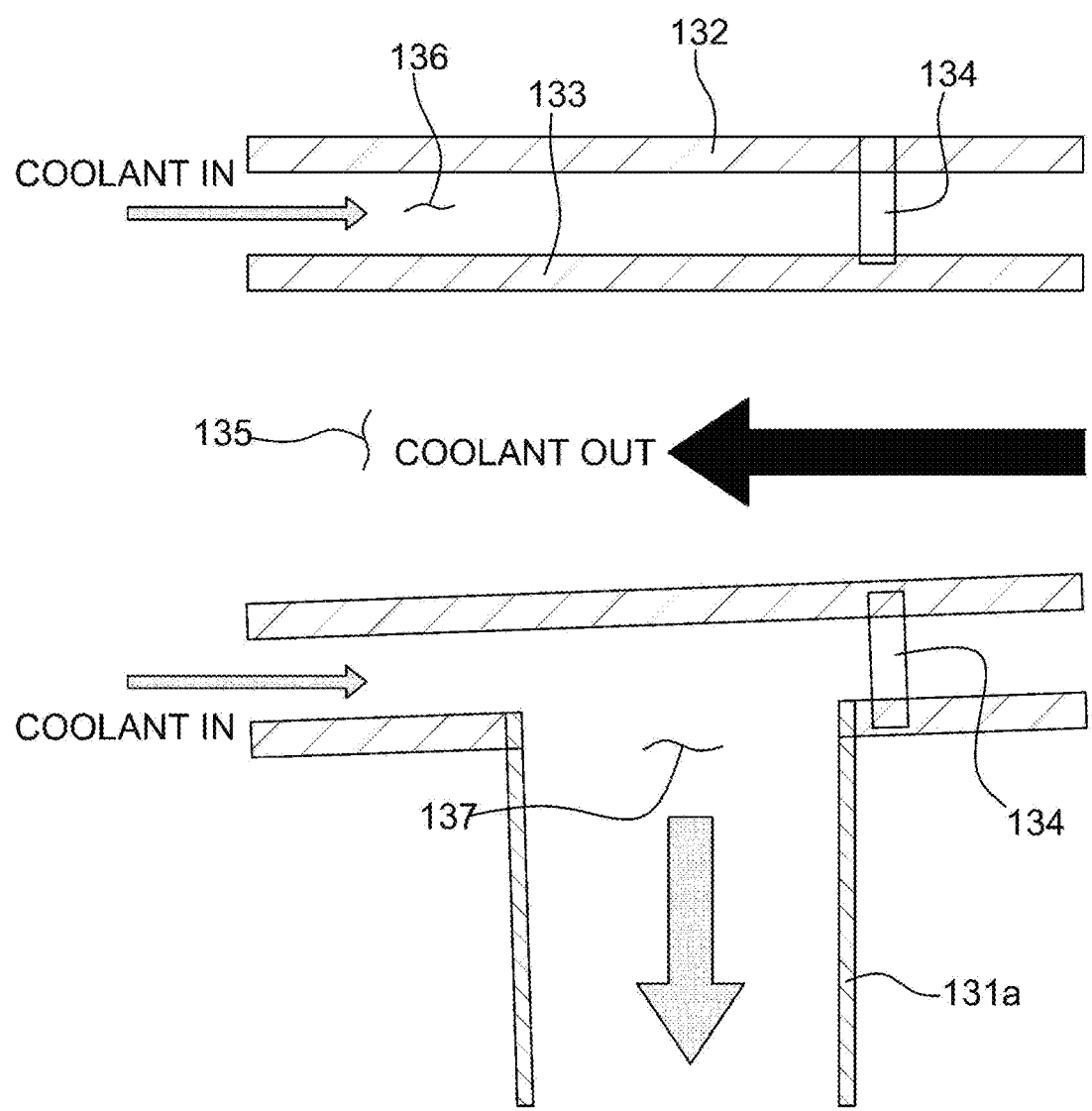
Figure 9B:
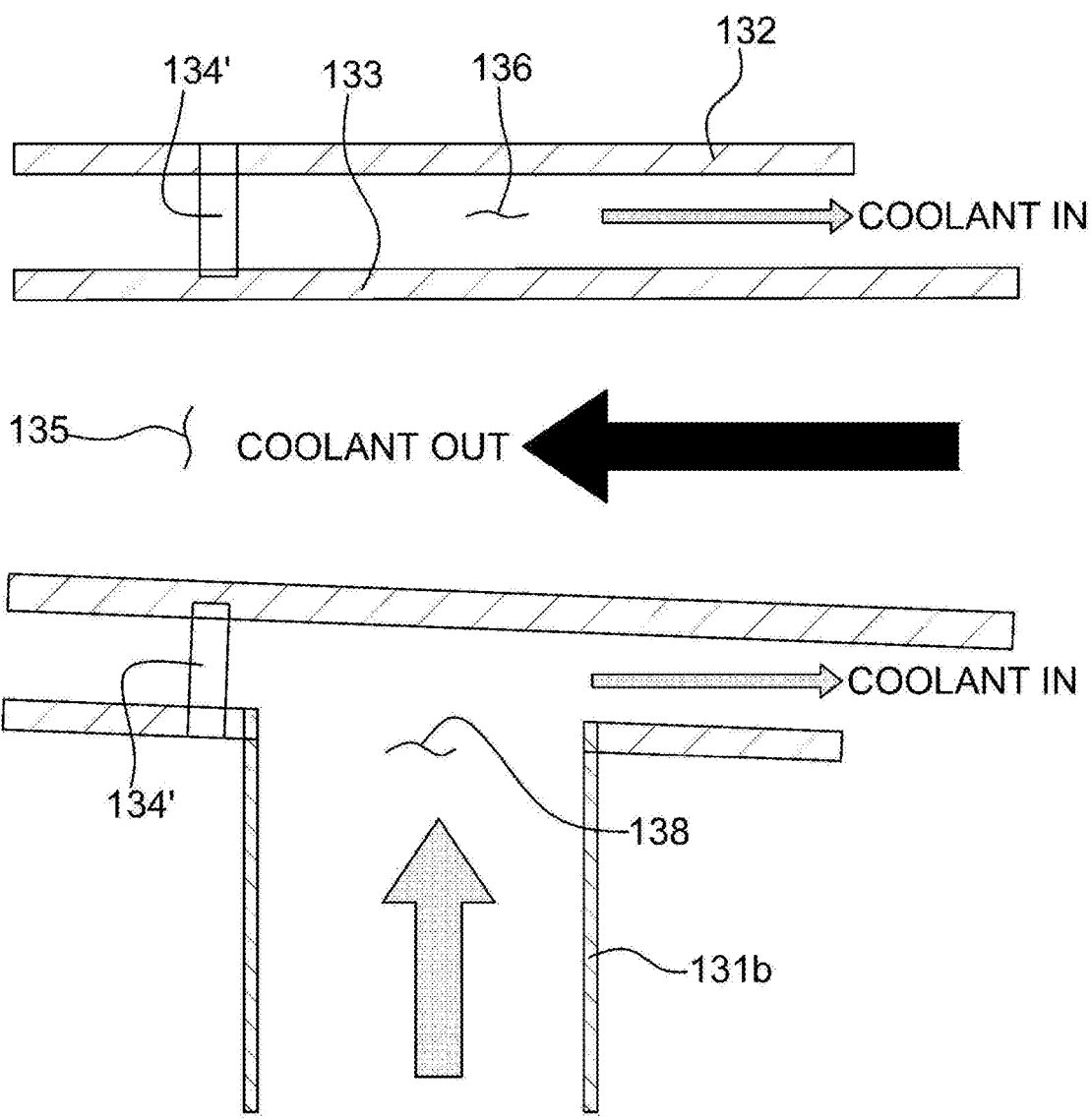

FIG. 7 is a perspective view illustrating a state in which the second tube of the apparatus for recovering exhaust heat according to the present disclosure is connected. FIG. 8 is a longitudinal cross-sectional view and FIGS. 9*a* and 9*b* are transverse cross-sectional views of the second tube of the apparatus for recovering exhaust heat according to the present disclosure. FIG. 9*a* is a transverse cross-sectional view taken along line C-C' in FIG. 7 and FIG. 9*b* is a transverse cross-sectional view taken along line D-D' in FIG. 7. FIG. 8 is a longitudinal sectional view of the second tube of the apparatus for recovering exhaust heat according to the present disclosure.

First, referring to FIG. 7, the second tube 130 of the apparatus 100 for recovering exhaust heat according to the present disclosure is configured to allow the coolant to be introduced into the first tube 120 or allow the coolant discharged from the first tube 120 to be discharged. The second tube 130 includes an outer tube 132 communicating with the outer tube 121 of the first tube 120, and an inner tube 133 communicating with the inner tube 122 of the first tube 120.

Particularly, a diameter of the outer tube 121 of the first tube 120 and a diameter of the outer tube 133 of the second tube 130 may be equal to each other. Likewise, a diameter of the inner tube 122 of the first tube 120 and a diameter of the inner tube 133 of the second tube 130 may also be equal to each other.

The U-shaped tube 131 is mounted at one side of the second tube 130. The U-shaped tube 131 is configured by integrally connecting one tube member 131*a* and the other tube member 131*b* in a U shape.

In this case, as illustrated in FIGS. 9*a* and 9*b*, an internal space of the inner tube 133 of the second tube 130 defines a coolant discharge path 135 through which the coolant introduced from the inner tube 122 of the first tube 120 is discharged to a coolant tank. A space between the outer tube 132 and the inner tube 133 of the second tube 130 defines a coolant inflow path 136 through which the coolant introduced from the coolant tank flows to the first tube 120.

One tube member 131*a* of the U-shaped tube 131 is connected to the U-shaped tube inlet 137 of the second tube 130, such that the coolant introduced into the coolant inflow path 136 is introduced into the U-shaped tube 131. The other tube member 131*b* of the U-shaped tube 131 is connected to the U-shaped tube outlet 138 of the second tube 130, such that the coolant introduced into the coolant inflow path 136 is discharged from the U-shaped tube 131 and introduced into the coolant inflow path 126 of the first tube 120.

In this case, as illustrated in the detailed cross-sectional views in FIGS. 8, 9*a* and 9*b*, in order to allow the coolant, which is introduced into the coolant inflow path 136 of the second tube 130, to flow to the U-shaped tube 131, a first baffle plate 134, which shields the coolant inflow path 136 between the outer tube 132 and the inner tube 133, is installed at the rear side at which the U-shaped tube inlet 137 of the second tube 130 is positioned. A second baffle plate 134', which shields the coolant inflow path 136 between the outer tube 132 and the inner tube 133, is installed at the front side at which the U-shaped tube outlet 138 of the second tube 130 is positioned.

When the coolant introduced into the coolant inflow path 136 is introduced into the U-shaped tube 131 as described above, the wax received in the cap 141 connected to the other tube member 131*b* of the U-shaped tube 131 is expanded or shrunk in accordance with a temperature of the coolant flowing in the U-shaped tube 131, such that the amount of coolant to be introduced is adjusted.

In other words, as illustrated in view (a) or FIG. 10 illustrating the operation of the U-shaped tube of the apparatus for recovering exhaust heat according to the present disclosure, the wax is supplied to the cap 141 from the container 142 of the wax supply unit 140. The lower hole 141*a* and the upper hole 141*b* of the cap 141 are connected to the other tube member 131*b* of the U-shaped tube 131. A channel T configured to connect the lower hole 141*a* and the upper hole 141*b* is installed in the cap 141. The channel C has a core 160 formed at a center thereof, and a wax layer 163 formed to be spaced apart from the core 160 at a predetermined distance and made as the wax is introduced and received from the container 142 of the wax supply unit 140. An inner circumferential surface of the wax layer 163 is shielded by a membrane 162, and a coolant flow path 161, through which the coolant introduced into the U-shaped tube 131 flows, is formed between the core 160 and the membrane 162 of the wax layer 163.

In this case, the core 160 is made of a material having high heat resistance so as not to be thermally deformed, and the membrane 162 is a material excellent in thermal conductivity.

The operation performed in accordance with a temperature of the coolant passing through the channel T formed in the cap 141 configured as described above is described below. As the apparatus for recovering exhaust heat according to the present disclosure operates, the temperature of the coolant introduced into the second tube 130 is gradually raised. Therefore, as illustrated in view (b) of FIG. 10, the wax layer 163 is expanded by the temperature of the coolant passing through the coolant flow path 161 of the channel T, such that a width of the wax layer 163 is increased to a first width a. When the temperature of the coolant is further raised, the wax layer 163 is further expanded, such that the width of the wax layer 163 is increased to a second width b, as illustrated in view (c) of FIG. 10. As a result, the inflow of the coolant through the coolant flow path 161 is almost blocked, and the overall coolant, which is heated by the heat exchanger 150 in the housing 110, is discharged to the outside. Thus, abnormal sound (different types of noise), which occurs when the residual coolant is heated by the heat exchanger, is eliminated, and durability of the apparatus for recovering exhaust heat is maintained appropriately.

Figure 11:
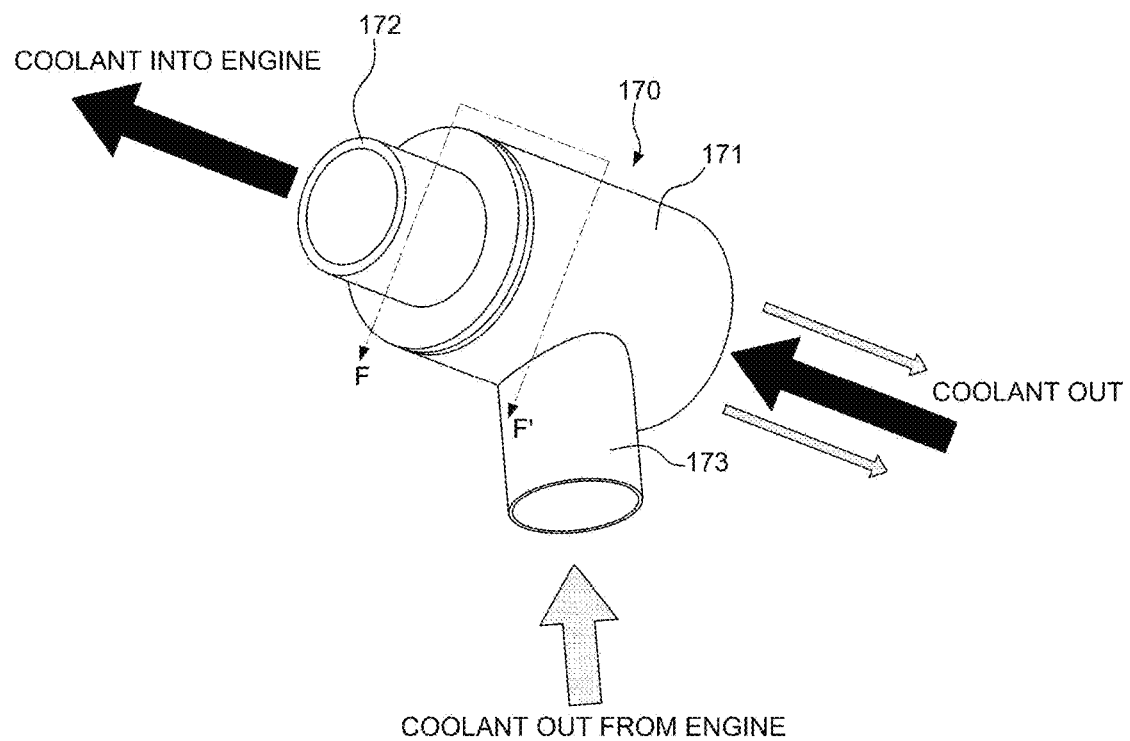
FIG. 11 is a perspective view of an engine-cooling-module-side connector of the apparatus for recovering exhaust heat according to the present disclosure.
Figure 12:
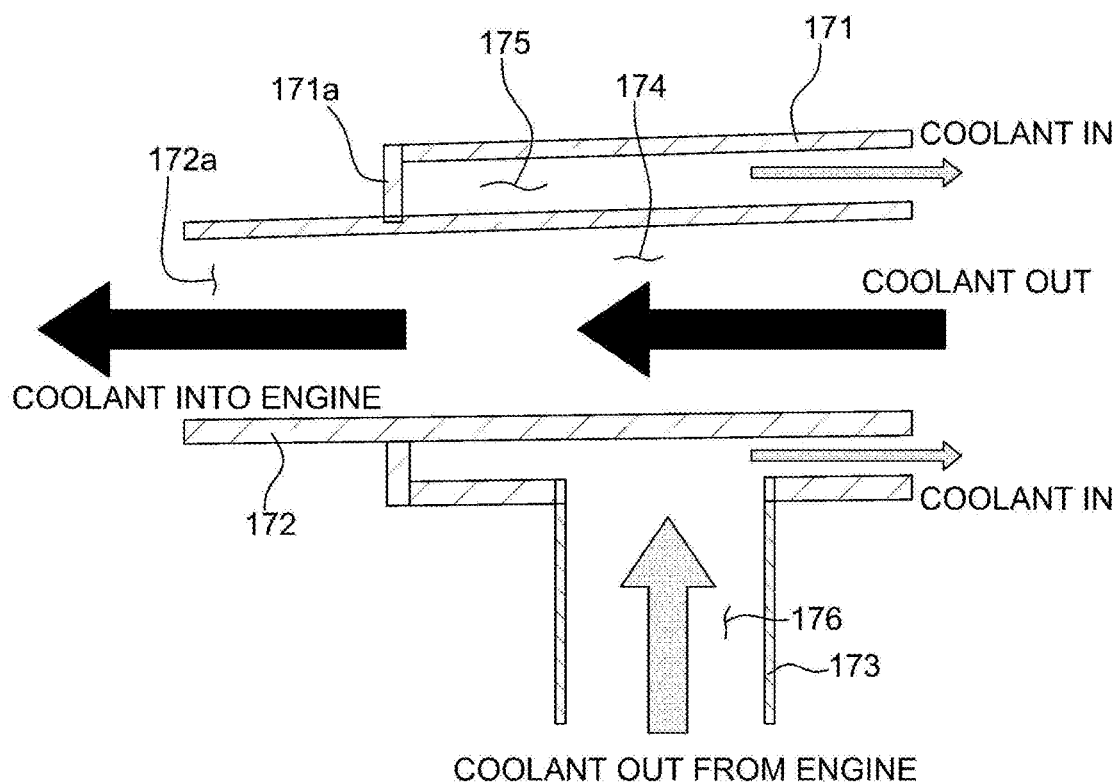
FIG. 12 is a cross-sectional view taken along line F-F' in FIG. 11 and illustrates a cross section of the connector of the apparatus for recovering exhaust heat according to the present disclosure.

FIG. 11 is a perspective view of an engine-cooling-module-side connector of the apparatus for recovering exhaust heat according to the present disclosure. FIG. 12 is a cross-sectional view taken along line F-F' in FIG. 11 and illustrates a cross section of the connector of the apparatus for recovering exhaust heat according to the present disclosure.

A connector tube 170 is a member connected to a coolant discharge pipe through which the coolant, which has been used to cool the engine, flows to return, and connected to a coolant inlet pipe through which the coolant flows to be supplied to the engine. The connector tube 170 is connected to the second tube 130 of the apparatus for recovering exhaust heat according to the present disclosure so as to introduce the coolant into the second tube 130 or receive the coolant from the second tube 130.

Referring to FIGS. 11 and 12, the connector tube 170 includes an external tube 171 shielded, at one side thereof, by a flat plate 171a. An internal tube 172 is installed in the external tube 171 and has an opening 172a formed at one side thereof. An entrance tube 173 is connected to the external tube 171 and into which the coolant, which has been used to heat the engine, flows to return. An interior of the internal tube 172 defines a discharge path 174 through which the coolant is discharged to the coolant inlet pipe of the engine. A space between the external tube 171 and the internal tube 172 defines an inflow path 175 through which the coolant, which is introduced from the coolant discharge pipe of the engine and introduced through the entrance path 176 of the entrance tube 173, flows to the second tube 130.

What is claimed is:

1. An apparatus for recovering exhaust heat, the apparatus comprising:
    a housing having therein a heat exchanger and having a front through hole through which exhaust gas is introduced and a rear through hole through which the introduced exhaust gas is discharged;
    a first tube installed in the housing and having a dual tube structure; and
    a second tube connected to the first tube and having a dual tube structure,
    wherein a coolant introduced through the second tube passes through the first tube and exchanges heat with the exhaust gas in the heat exchanger in the housing, and
    wherein the coolant, which has exchanged heat, is discharged to an engine through the first tube and the second tube.

2. The apparatus of claim 1, wherein the first tube comprises:
    an outer tube; and
    an inner tube installed in the outer tube,
    wherein an outlet port and an inlet port for the coolant are formed in the outer tube,
    wherein an internal space of the inner tube defines a coolant discharge path through which the coolant introduced into the inlet port flows to the second tube, and
    wherein a space between the outer tube and the inner tube defines a coolant inflow path through which the coolant introduced from the second tube flows to the outlet port.

3. The apparatus of claim 2, wherein the inlet port communicates with a coolant outflow port formed in the housing, and wherein the outlet port communicates with a coolant inflow port formed in the housing.

4. The apparatus of claim 2, wherein the first tube has a support piece to support the inner tube installed in the internal space of the outer tube, and wherein the support piece is attached, at one side thereof, to an inner circumferential surface of the outer tube and attached, at the other side thereof, to an outer circumferential surface of the inner tube.

5. The apparatus of claim 2, wherein the second tube comprises:
    an outer tube communicating with the outer tube of the first tube; and
    an inner tube communicating with the inner tube of the first tube,
    wherein an internal space of the inner tube defines a coolant discharge path through which the coolant introduced from the inner tube of the first tube is discharged, and
    wherein a space between the outer tube and the inner tube of the second tube defines a coolant inflow path through which the coolant flows to the first tube.

6. The apparatus of claim 5, wherein a U-shaped tube configured by integrally connecting one tube member and another tube member in a U shape is installed at one side of the second tube,
    wherein the one tube member is connected to a U-shaped tube inlet of the second tube, such that the coolant introduced into the coolant inflow path is introduced into the U-shaped tube, and
    wherein the other tube member is connected to a U-shaped tube outlet of the second tube, such that the coolant introduced into the coolant inflow path is discharged from the U-shaped tube and introduced into the coolant inflow path of the first tube.

7. The apparatus of claim 6, comprising:
    a wax supply unit installed outside the housing and configured to supply wax to be expanded or shrunk in accordance with a temperature of the coolant introduced through the U-shaped tube connected to the second tube.

8. The apparatus of claim 7, wherein the wax supply unit comprises:
    a container coupled by a bracket mounted outside the housing, the container being opened at one side thereof and having a space portion for receiving the wax;

a cap configured to seal the opening at one side of the container and allow the wax received in the container to be supplied; and a valve installed at the other side of the container and configured to adjust the amount of wax received in the cap and the container by elastic force of a spring that operates in conjunction with the valve.

9. The apparatus of claim 8, wherein a lower hole and an upper hole of the cap are connected to the other tube member of the U-shaped tube, and a channel configured to connect the lower hole and the upper hole is installed in the cap, wherein the channel has a core formed at a center thereof, and has a wax layer formed to be spaced apart from the core at a predetermined distance and made as the wax is introduced and received from the container of the wax supply unit, wherein an inner circumferential surface of the wax layer is shielded by a membrane, and wherein a coolant flow path, through which the coolant introduced into the U-shaped tube flows, is formed between the core and the membrane of the wax layer.

10. The apparatus of claim 6, wherein, in order to allow the coolant, which is introduced into the coolant inflow path of the second tube, to flow to the U-shaped tube, a first baffle plate, which shields the coolant inflow path between the outer tube and the inner tube, is installed at a rear side at which the U-shaped tube inlet of the second tube is positioned, and a second baffle plate, which shields the coolant inflow path between the outer tube and the inner tube, is installed at a front side at which the U-shaped tube outlet of the second tube is positioned.

11. The apparatus of claim 5, comprising:

a connector tube connected to the second tube to introduce the coolant into the second tube or receive the coolant from the second tube.

12. The apparatus of claim 11, wherein the connector tube comprises:

an external tube shielded, at one side thereof, by a flat plate;

an internal tube installed in the external tube and having an opening formed at one side thereof; and an entrance tube connected to the external tube and into which the coolant, which has been used to cool the engine, flows to return, wherein an interior of the internal tube defines a discharge path through which the coolant is discharged to the coolant inlet pipe of the engine, and wherein a space between the external tube and the internal tube defines an inflow path through which the coolant, which is introduced from a coolant discharge pipe of the engine and introduced through an entrance path of the entrance tube, flows to the second tube.

* * * * *